United States Patent
Suda (10) Patent No.: US 6,396,870 B1
(45) Date of Patent: May 28, 2002

(54) MATCHED FILTER SIMULTANEOUSLY OPERATING FOR TWO DIFFERENT TYPE CODES

(75) Inventor: Kei Suda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/229,166

(22) Filed: Jan. 13, 1999

(30) Foreign Application Priority Data

Jan. 14, 1998 (JP) .......................................... 10-005667

(51) Int. Cl.⁷ .......................... H04B 15/00; H04K 1/00; H04L 27/30
(52) U.S. Cl. ....................... 375/152; 375/142; 375/143; 375/343; 375/150
(58) Field of Search ................................ 375/152, 143, 375/142, 150, 343

(56) References Cited

U.S. PATENT DOCUMENTS 5,293,398 A  *  3/1994  Hamao et al. .................. 375/1
6,259,725 B1 *  7/2001  Schilling ..................... 375/150

FOREIGN PATENT DOCUMENTS

JP    6-097775    4/1994    .......... H03H/17/02
JP    7-154365    6/1995    ............ H04J/13/04

OTHER PUBLICATIONS

Korean Office Action dated Apr. 24, 2001, with partial English translation.

* cited by examiner

*Primary Examiner*—Mohammad H. Ghayour
(74) *Attorney, Agent, or Firm*—McGinn & Gibb, PLLC

(57) ABSTRACT

In a matched filter, a plurality of data holding circuits adapted to sequentially hold a plurality of straight binary data and a plurality of correlators are provided. Each of the correlators receiving one bit of a known code and one bit of a selected code as a 2-bit code outputs the straight binary data as it is when the 2-bit code is "00", outputs the straight binary data after logically inverting when the straight binary data when the 2-bit code is "11", and outputs exclusive OR values between the straight binary data except for its most significant bit and the most significant bit while outputting "1" for the most significant bit when the 2-bit code is one of "01" and "10". Also, an adder adds output signals of the correlators and outputs an addition result as a correlation value.

8 Claims, 7 Drawing Sheets

MATCHED FILTER SIMULTANEOUSLY OPERATING FOR TWO DIFFERENT TYPE CODES

BACKGROUND OF THE INVENTION

1. Field of the Invention

The present invention relates to a matched filter used in a code division multiple access (CDMA) receiver for determining the correlation between input data and scrambling codes.

2. Description of the Related Art

Generally, a CDMA transmission/reception system is adapted to multiple access, using scrambling/descrambling operation, a plurality of scrambling codes and carrier waves of the same frequency. This will be explained later in detail.

With the CDMA transmission/reception system, however, a receiver cannot correctly carry out a descrambling operation if it misses the right timing of scrambling operation carried out by a base station.

Additionally, since each base station has a plurality of scrambling codes it uses, the receiver cannot know in advance the scrambling code being used by the base station to be accessed by the receiver. However, if the receiver cannot get any information from the base station, the receiver cannot access the base station unless it can specifically know the scrambling code that the base station uses.

A perch function using a matched filter is used to solve the above-mentioned problem. This also will be explained later in detail.

A prior art matched filter is accompanied by the following problems. The operation of obtaining the scrambling timing and that of identifying a scrambling code being used by the base station are carried out independently at different timings, so that a discrepancy in the correlating timing and, in the worst case, a total incapability of signal reception can occur. Also, half of the power used for receiving the codes is consumed for nothing.

SUMMARY OF THE INVENTION

It is an object of the present invention to provide a matched filter that can carry out an operation of obtaining the timing of a base station by using a known scrambling code contained in a long code mask symbol and an operation of determining if a selected scrambling code agrees with a scrambling code contained in the logic symbol.

According to the present invention, in a matched filter, a plurality of data holding circuits adapted to sequentially hold a plurality of straight binary data and a plurality of correlators are provided. Each of the correlators receiving one bit of a known code such as a known scrambling code and one bit of a selected code such as a scrambling code selected by a base station as a 2-bit code, outputs the straight binary data as it is when the 2-bit code is "00", outputs the straight binary data after logically inverting the straight binary data when the 2-bit code is "11", and outputs exclusive OR values between the straight binary data except for its most significant bit and the most significant bit while outputting "1"for the most significant bit when the 2-bit code is one of "01" and "10". Also, an adder adds output signals of the correlators and outputs an addition result as a correlation value.

BRIEF DESCRIPTION OF THE DRAWINGS

The present invention will be more clearly understood from the description as set forth below, as compared with the prior art, with reference to the accompanying drawings, wherein.

DESCRIPTION OF THE PREFERRED EMBODIMENT

Before the description of the preferred embodiments, prior art CDMA transmission/reception systems will be explained with reference to FIGS. 1 through 4.

Figure 1:
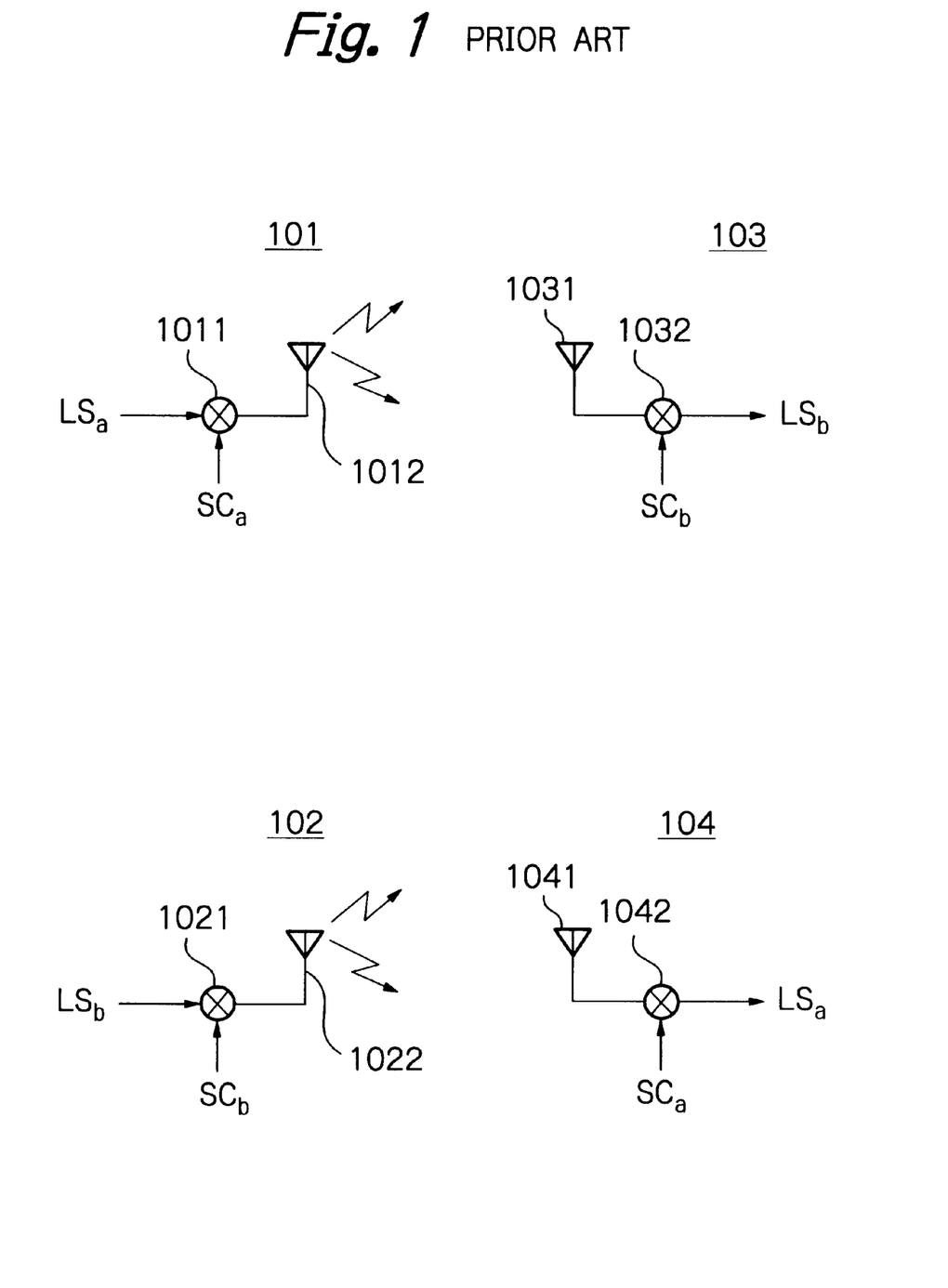
FIG. 1 is a circuit diagram illustrating a first prior art CDMA transmission/reception system.

In FIG. 1, which illustrates a first prior art CDMA transmission/reception system, reference numerals 101 and 102 designate base stations, particularly, transmitters thereof, and 103 and 104 designate mobile stations, particularly, receivers thereof. The transmitter 101 scrambles a logic symbol $LS_a$ by a scrambler 1011 using a scrambling code $SC_a$ and transmits it by a carrier wave from an antenna 1012. Similarly, the transmitter 102 scrambles a logic symbol $LS_b$ by a scrambler 1021 using a scrambling code $SC_b$ and transmits it by a carrier wave from an antenna 1022. In this case, the frequency of the carrier wave of the transmitter 101 is the same as that of the transmitter 102. Also, the transmission rate of scrambling codes is normally tens to several hundreds of times of that of logic symbols.

The receiver 103 receives the carrier waves from the transmitters 101 and 102 from an antenna 1031 and descrambles the carrier waves by a descrambler 1032 using the scrambling code $SC_b$ to take out the logic symbol $LS_b$. Similarly, the receiver 104 receives the carrier waves from the transmitters 101 and 102 from an antenna 1041 and descrambles the carrier waves by a descrambler 1042 using the scrambling code $SC_a$ to take out the logic symbol $LS_a$.

Thus, the CDMA transmission/reception system of FIG. 1 is adapted to multiple access, using scrambling/descrambling operation, a plurality of scrambling codes and carrier waves of the same frequency.

With the CDMA transmission/reception system of FIG. 1, however, the receiver 103 or 104 cannot correctly carry out a descrambling operation if it misses the right timing of scrambling operations carried out by the transmitter 102 or 101 If the scrambling timing of the receivers 103 or 104 is deviated even by a single chip (time period for several bits of data), the receiver 103 or 104 can no longer receive the signal transmitted from the transmitter 102 or 101 at all. Particularly, with a wide band CDMA (W-CDMA) transmission/reception system that belongs to the category of CDMA, no base stations (transmitters) synchronize their output signals and, therefore, a receiver sequentially has to try to synchronize its signal receiving operation with the signal of one base station it receives each time it switches from one base station to another.

Additionally, since each base station has a plurality of scrambling codes it uses, the receiver cannot know in advance the scrambling code being used by the base station to be accessed by the receiver. For example, a W-CDMA type transmission/reception system is adapted to use a total of 32 scrambling codes and there is no way for the receiver to know in advance the scrambling code that the base station uses. However, if the receiver cannot get any information from the base station, the receiver cannot access the base station unless it can specifically know the scrambling code that the base station is using.

A perch function is used to solve the above-mentioned problem. With a perch function, the receiver can obtain information from the base station on the scrambling codes and the timings that the base station uses for scrambling logic symbols. Then, the receiver can obtain information on the scrambling codes and so on from the base station by carrying out a perch search operation by means of the perch function.

Figure 2:
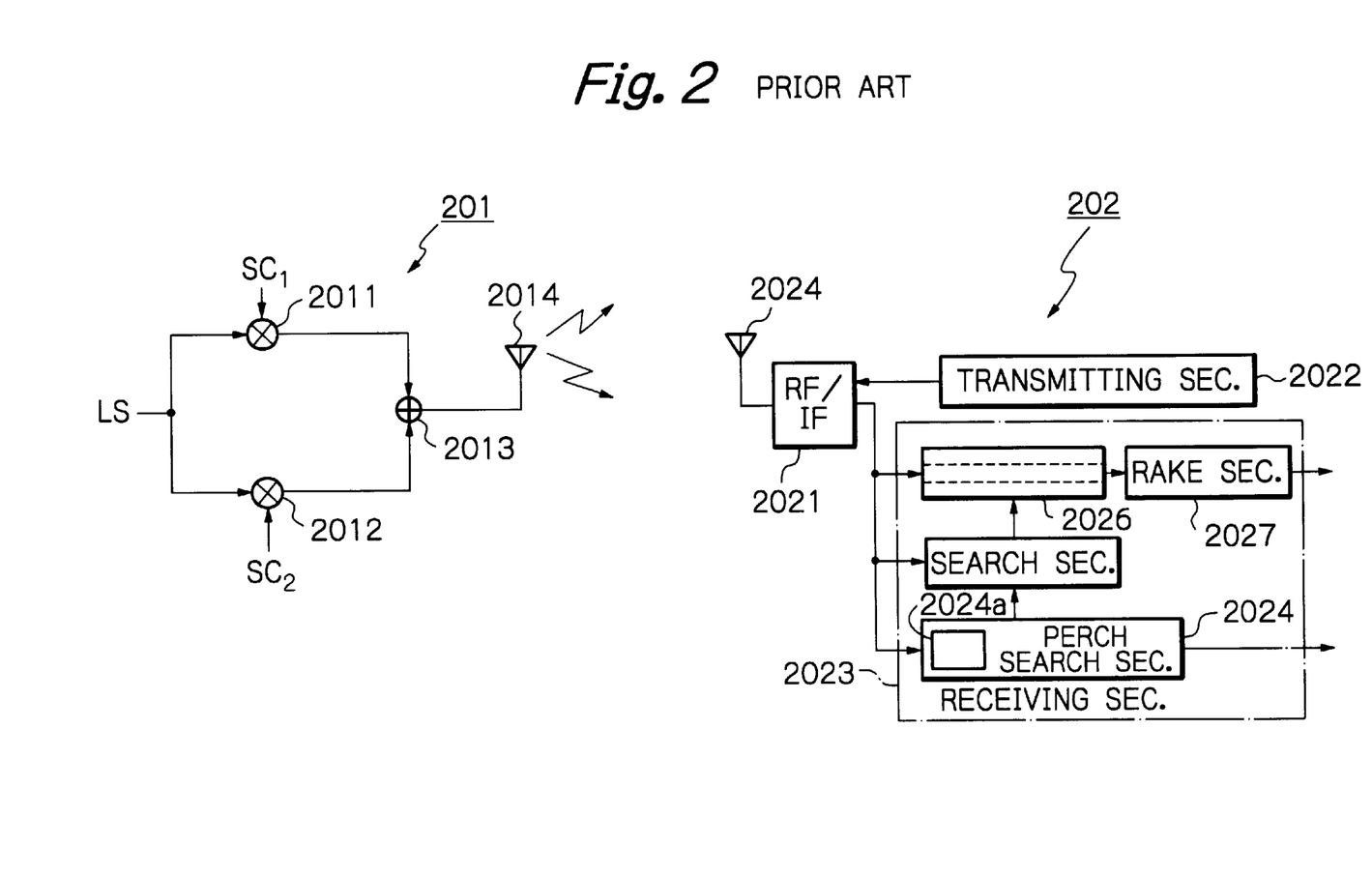
FIG. 2 is a circuit diagram illustrating a second prior art CDMA transmission/reception system.

In FIG. 2, which illustrates a second prior art CDKA transmission/reception system, reference numeral 201 designates a base station, particularly, a transmitter thereof, and 202 designates a mobile station.

The transmitter 201 is constructed by two scramblers 2011 and 2012, an adder 2013, and an antenna 2014. The adder 2013 adds a signal obtained by scrambling a logic symbol LS by means of the scrambler 2011 using a known scrambling code $SC_1$ to a signal obtained by scrambling the same logic symbol LS means of the scrambler 2012 using an unknown scrambling code $SC_2$ that the transmitter 201 uses out of the 32 scrambling codes. Then, the signal obtained by addition as a long code mask symbol is transmitted from the antenna 2014. Note, that the two scrambling codes $SC_1$ and $SC_2$ of different types are started at the same timing, and the logic symbols are identical before they are scrambled.

The mobile station 202 is constructed by a ratio frequency/intermediate frequency (RF/IF) section 2021, a transmitting section 2022, a receiving section 2023, and an antenna 2024.

The transmitting section 22 outputs to the RF/IF section 2021 a base band signal to be transmitted to the base station 201.

The RF/IF section 2021 modulates the carrier wave by means of the base band signal output from the transmitting section 2022 and transmits the modulated carrier wave from the antenna 2024 to the base station 201. It also demodulates the signal transmitted via the antenna 2024 from the base station 201 and outputs the demodulated signal to the receiving section 2023.

The receiving section 2023 is constructed by a perch search section 2024, a search section 2025, finger receiving sections 2026 and a rake receiving section 2027.

The perch search section 2024 obtains various pieces of information on the base station 201 from the base band signal demodulated by the RF/IF section 2021 and outputs them to the downstream-side circuit. The perch search section The search section 2025 detects the difference between the timing of the direct wave and the reflected wave due to the multipath component of the base band signal.

The finger receiving sections 2026 correct the difference in the timing between different signals by delaying the base band signal as a function of the difference of the timing detected by the search section 2025.

The rake receiving section 2027 synthetically combines the signals received by the finger receiving sections 2026 at an optimum ratio and outputs the synthesized signal to the downstream-side circuit.

FIGS. 3A through 3D are data formats showing a data structure of a perch channel through which the perch search section 2024 receives signals.

Figure 3A:
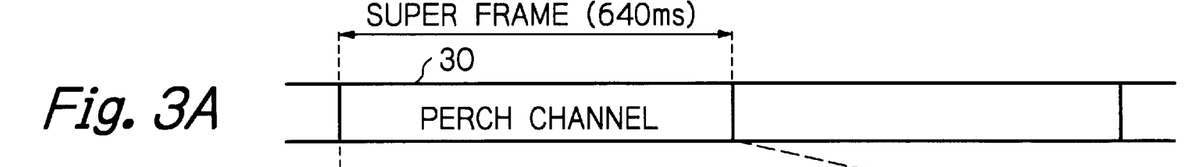
FIGS. 3A through 3D are data formats showing a data structure of a perch channel through which the perch search section of FIG. 2 receives signals.
Figure 3B:
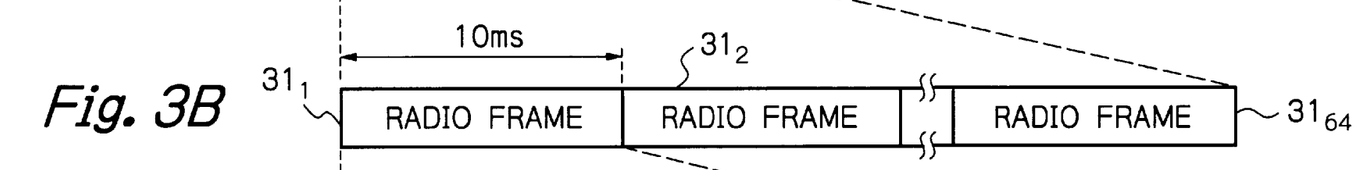

As shown in FIG. 3A, a perch channel 30 is one of a number of 640 msec super frames. Also, as shown in FIG. 3B, the perch channel 30 is formed by 64 ratio frames $31_1$ through $316_4$ for transmitting information on each of the related receivers.

Figure 3C:
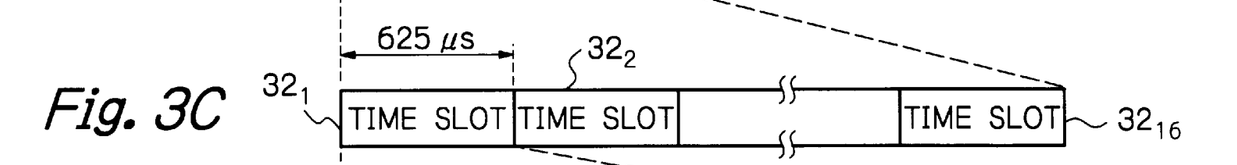
Figure 3D:
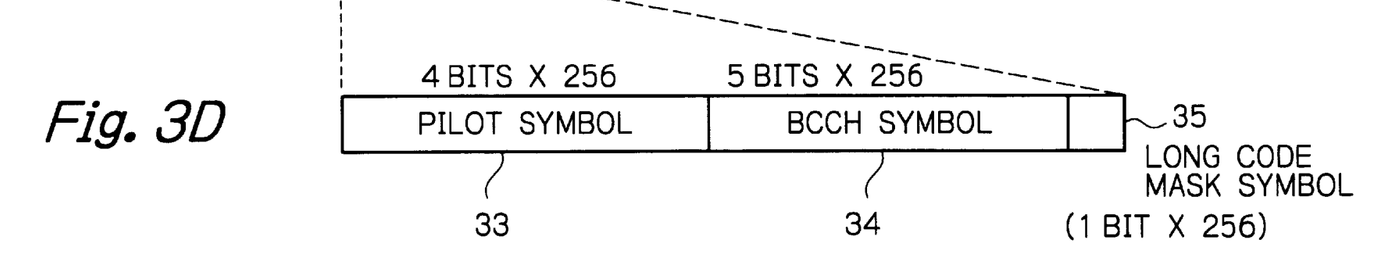

As shown in FIG. 3C, the ratio frame 31-1 is formed by time slots $32_1$ through $32_{14}$, of which the time slot $32_1$ is formed by a pilot symbol 33, a broadcast channel (BCCH) symbol 34 and a long code mask symbol 35, as shown in FIG. 3D.

Note that 1 bit of a logic symbol is scrambled to 256 chips in FIGS. 3A through 3D in order to illustrate a W-CDMA transmission/reception system where the scrambling code has a length of 256 chips.

The long code mask symbol 35 is produced by adding a signal obtained by scrambling a 1-bit logic symbol by means of the scrambler 2011 using a known scrambling code $SC_1$ and a signal obtained by scrambling the same logic symbol by means of the scrambler 2012 using an unknown scrambling code $SC_2$.

The receiver 2123 firstly gets the scrambling timing from the long code mask symbol 35 as shown in FIG. 3D and detects the unknown scrambling code being used by the base station 201 by using the scrambling timing. For this purpose the matched filter 2024a is provided in the perch search section 2024.

Figure 4:
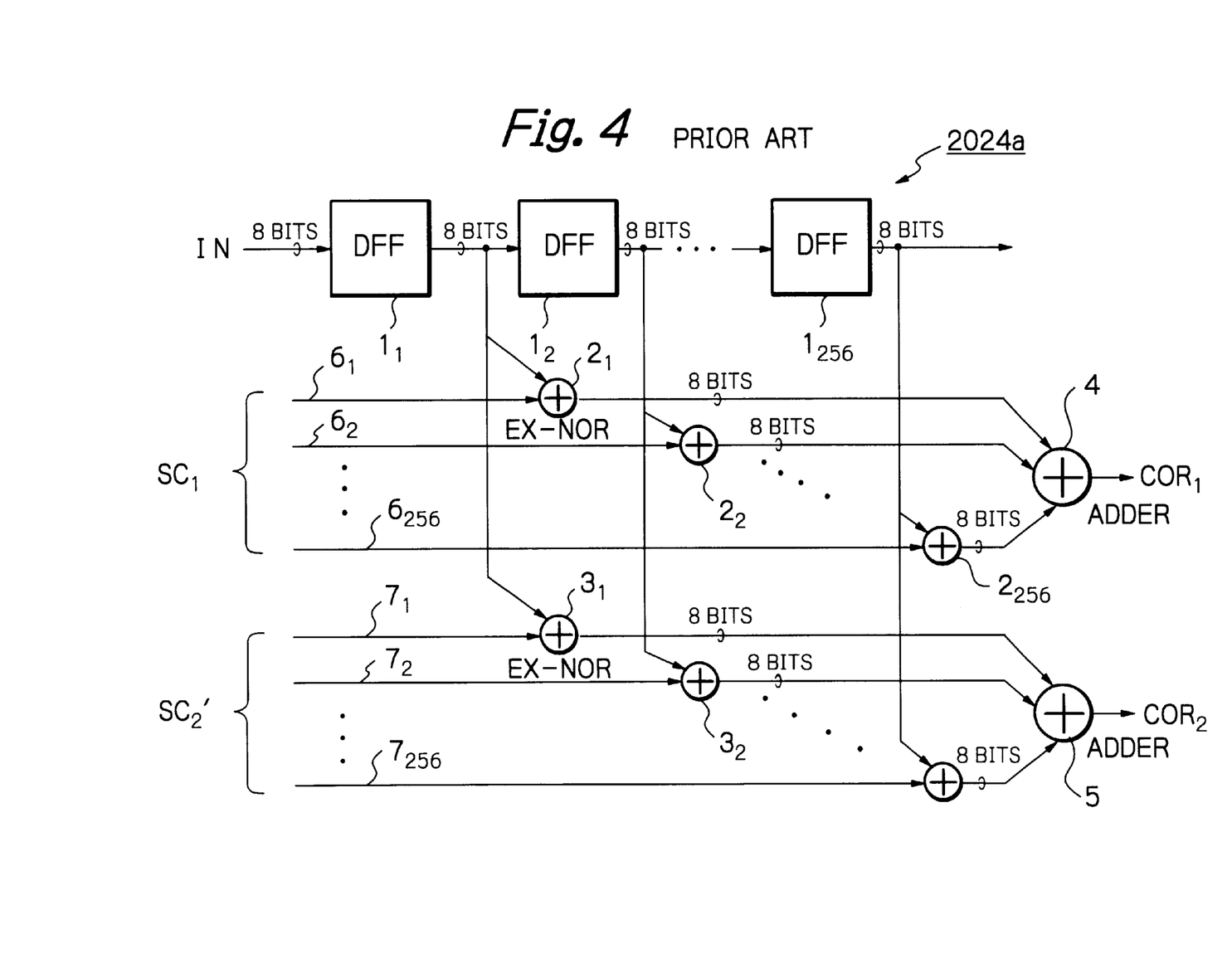
FIG. 4 is a circuit diagram of the matched filter of the system of FIG. 2.

In FIG. 4, which is a circuit diagram of the matched filter 2024a of FIG. 2, the matched filter 2024a is constructed by dynamic flip-flop circuits $1_1$ through $1_{256}$, exclusive NOR circuits $2_1$ through $2_{256}$ exclusive NOR circuits $3_1$ through $3_{256}$ and adders 4 and 5.

The matched filter 2024a firstly transforms a received base band signal into an input data IN of a straight binary signal with a bit width of 8 bits by an analog/digital (A/D) converter (not shown).

Then, the dynamic flip-flop circuits $1_1$ through $1_{256}$ sequentially hold the 8-bit input data IN on a chip rate basis.

The exclusive NOR circuits $2_1$ through $2_{256}$ determine exclusive NORs of the 8-bit input data IN held by the 93 respective dynamic flip-flop circuits $1_1$ through $1_{256}$ and the respective known scrambling codes $6_1$ through $6_{256}$ ($SC_1$).

The exclusive NOR circuits $3_1$ through $3_{256}$ determine exclusive NORs of the 8-bit input data IN held by the respective dynamic flip-flop circuits $1_1$ through $1_{256}$ and selected respective scrambling codes $7_1$ through $7_{256}$ ($SC_2$').

The adder 4 adds the outputs of the exclusive NOR circuits $2_1$ through $2_{256}$ and outputs the addition result as a correlation value $COR_1$.

On the other hand, the adder 5 adds the outputs of the exclusive NOR circuits $3_1$ through $3_{256}$ and outputs the addition result as a correlation value $COR_2$.

Now, the operation of the matched filter 2024a of FIG. 4 will be explained below.

Firstly, the matched filter 2024a uses the known scrambling codes $6_1$ through $6_{256}$ and determines the scrambling timing of the base station from which it is going to receive signals.

The input data that has been transformed into an 8-bit signal is held sequentially and commonly by the dynamic flip-flop circuits $1_1$ through $1_{256}$ and the exclusive NOR circuits $2_1$ through $2_{256}$ determine the exclusive NORs of the signal and the known respective scrambling codes $6_1$ through $6_{256}$.

While only the operation of the exclusive NOR circuit $2_1$ is described here, the description applies to all the exclusive NOR circuits $2_1$ through $2_{256}$ and the remaining exclusive NOR circuits $2_2$ through $2_{256}$ operate in a similar way.

As a result of the exclusive NOR circuit $2_1$ determining the above described exclusive NOR, the data held by the dynamic flip-flop circuit $1_1$ is output when the known scrambling code $6_1$ is equal to "1" whereas the data held by the dynamic flip-flop circuit $1_1$ is logically inverted before it is output when the known scrambling code $6_1$ is equal to "0".

Then, the adder 4 adds all the outputs of the exclusive NOR circuits $2_1$ through $2_{256}$ and outputs the addition result as an obtained correlation value $COR_1$. If the obtained correlation value COR shows a large value, it means that the input data IN and the known scrambling codes $6_1$ through $6_{256}$ agree with each other, so that the receiver can use the obtained timing as the scrambling timing of the base station.

Then, the matched filter 2024a selects one of the scrambling codes that the base station may use and uses it as scrambling codes $7_1$ through $7_{256}$.

Since the scrambling timing is already known, the matched filter 2024a selects a start timing on the basis of the scrambling timing and determines the correlation between the selected scrambling codes $7_1$ through $7_{256}$ and input data in the same manner as described above. More, specifically, it monitors the value of the obtained correlation value $COR_2$ for the scrambling timing and determines if the obtained correlation value $COR_2$ shows a large value at the obtained scrambling timing.

If the obtained correlation value $COR_2$ does not show a large value, it means that the selected scrambling codes $7_1$ through $7_{256}$ are not the one being used by the base station and hence the matched filter 2024a selects another scrambling code and uses it as scrambling codes $7_1$ through $7_{256}$.

If it is confirmed that the obtained correlation value $COR_2$ shows a large value in synchronization with the scrambling timing obtained by the above operation, then it means that the selected scrambling codes $7_1$ through $7_{256}$ represent the scrambling code being used by the base station.

It may be appreciated that the unknown scrambling code being used by the base station is detected only after obtaining the scrambling timing by using known scrambling codes $6_1$ through $6_{256}$ because it is extremely difficult to determine if an obtained correlation is correct or not when neither the scrambling timing nor the identification of the scrambling code being used by the base station are known.

Thus, it is necessary for the matched filter 2024a of FIG. 4 to obtain the scrambling timing first and, thereafter, select the start timing of the unknown scrambling code being used by the base station.

Additionally, because of the fact that a receiver cannot use a high precision reference oscillator as used by the base station and the moving speed of the receiver is always changing, the correlating timing between the base station and the receiver can come to show a discrepancy over the course of time. The receiver normally has an automatic frequency control (AFC) feature for correcting the error between the basic clock signal of the receiver and that of the base station and the discrepancy in the correlating timing between them. However, since a perch search operation is an initial operation for the receiver to access the base station by way of a ratio wave, an AFC operation cannot be carried out during the perch search operation.

Thus, the scrambling timing obtained by using a known scrambling code can be shifted with time and, during the operation of determining if the selected scrambling code agrees with the scrambling code being used by the base station, the scrambling timing that the receiver is using can be shifted from the actual scrambling timing. Any deviation from the actual scrambling timing results In a reduced reception gain and a degraded performance of the system that can lead to a total incapability of signal reception in the worst case.

Additionally, with the system of FIG. 2, the base station 201 allocates equal transmission power to two scrambling codes $SC_1$ and $SC_2$ and the receiver 202 has to determine the correlation for each of them so that half of the power used for receiving the codes is in fact consumed for nothing.

Figure 5:
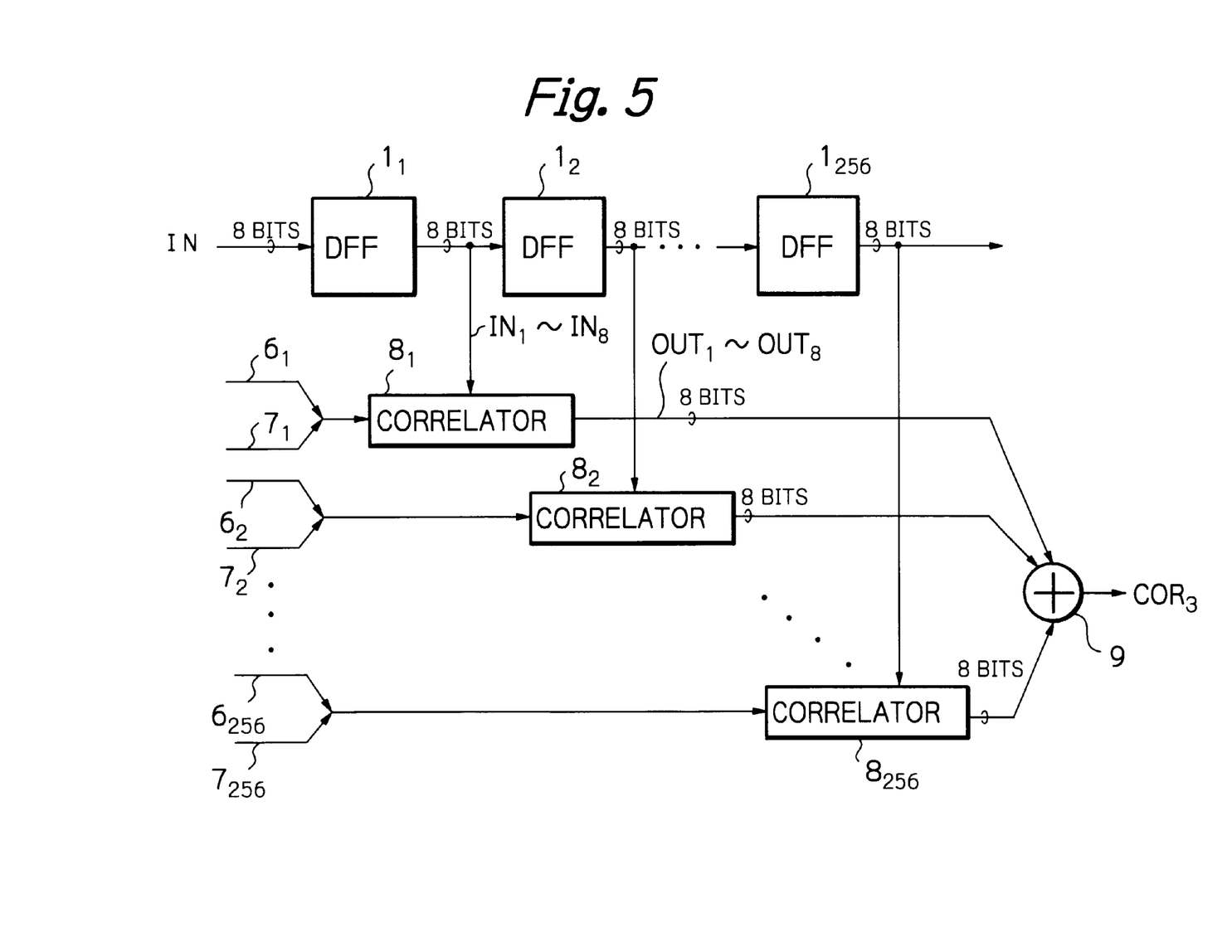
FIG. 5 is a circuit diagram illustrating an embodiment of the matched filter according to the present invention.

In FIG. 5, which illustrates an embodiment of the matched filter according to the present invention, the exclusive NOR circuits $2_1$ through $2_{256}$ and $3_1$ through $3_{256}$ of FIG. 4 are replaced by correlators $8_1$ through $8_{256}$, and the adders 4 and 5 of FIG. 4 are replaced by a single adder 9.

Each of the correlators $8_1$ through $8_{256}$ receives the a corresponding one of the known scrambling codes $6_1$ through $6_{256}$ and one of the selected scrambling codes $7_1$ through $7_{256}$ as a signal with a 2-bit code value having corresponding bits in combination and then carries out a processing operation on the input signals $IN_1$ to $IN_2$ held by the corresponding one of the dynamic flip-flop circuits $1_1$ through $1_{256}$ on the basis of the scrambling code values such as $6_1$ and $7_1$ in a manner as will be described below.

Figure 6:
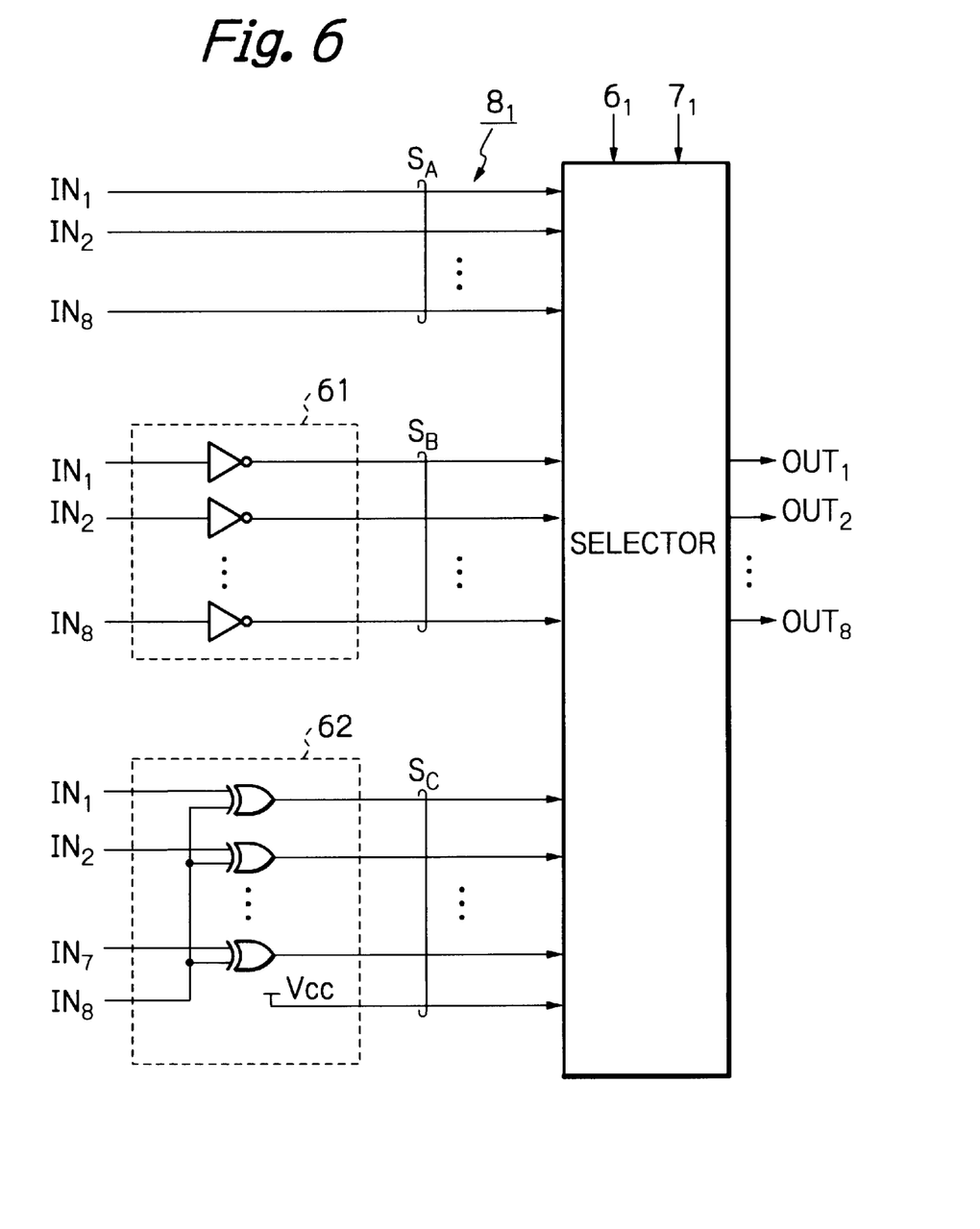
FIG. 6 is a circuit diagram of the correlator of FIG. 5.

FIG. 6 is a detailed circuit diagram of the correlator $8_1$ of FIG. 5; however, a similar configuration is applied to the other correlators $8_2$ through $8_{256}$ of FIG. 5.

In FIG. 6, the correlator $8_1$ is constructed by an inverter circuit section 61, an exclusive OR circuit section 62 and a selector 63. That is, the input signals $IN_1$ through $IN_8$ are supplied as an 8-bit signal $S_A$ to the selector 63. On the other hand, the inverter circuit section 61 receives the input signals $IN_1$ through $IN_8$ and transmits its output signal $S_B$ to the selector 63, and the exclusive OR circuit section 62 receives the input signals $IN_1$ through $IN_8$ and transmits its output signal $S_X$ to the selector 63.

Figure 7A:
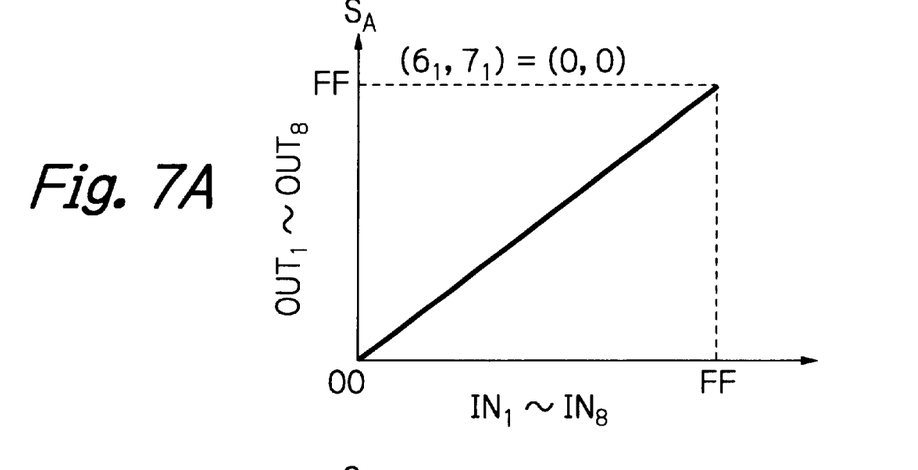
FIGS. 7A, 7B and 7C are is a graphs showing the output characteristics of the matched filter of FIG. 5.
Figure 7B:
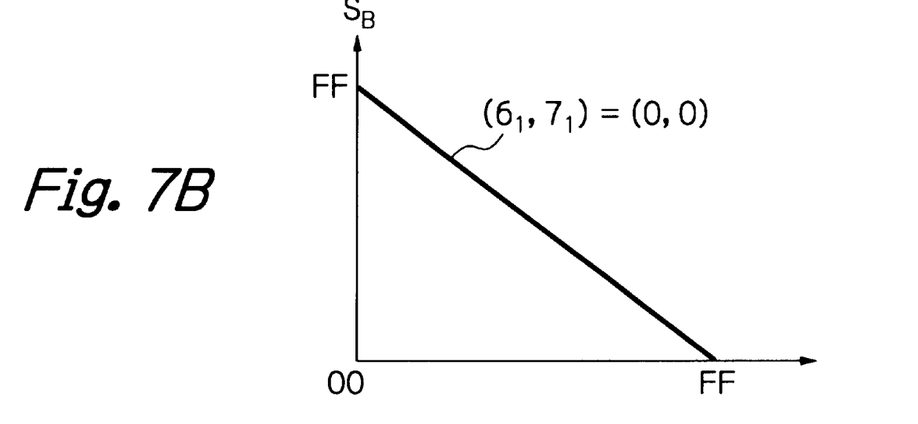
Figure 7C:
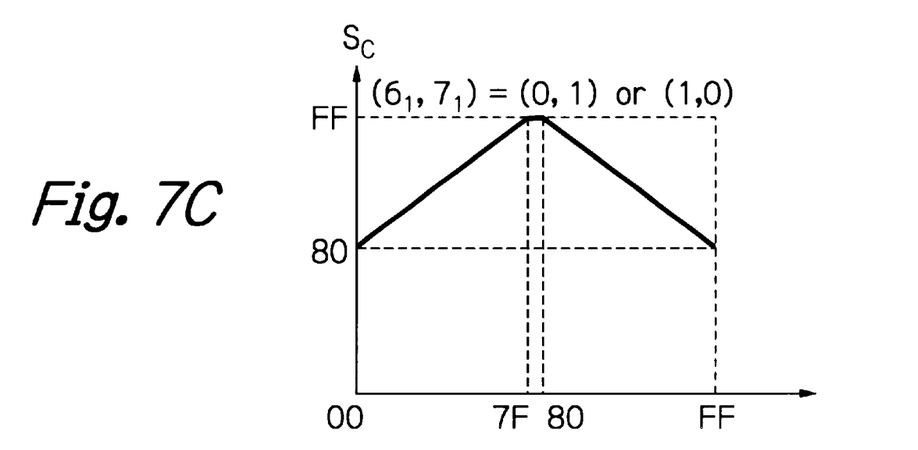

Since the signal $S_A$ is equal to the combination of the input signals $IN_1$ through $IN_8$, the relationship between the input signals $IN_1$ through $IN_8$ and the signal $S_A$ is as shown in FIG. 7A. Also, since the signal $S_B$ is the combination of inverted signals of the input signals $IN_1$ through $IN_8$, the relationship between the input signals $IN_1$ through $IN_8$ and the signal $S_B$ is as shown in FIG. 7B. Further, the signal $S_C$ is a combination of exclusive ORs of the input signals $IN_1$ through $IN_7$ and the most significant bit input signal $IN_8$, and a most significant bit $V_{CC}$(="1"), the relationship between the input signals $IN_1$ through $IN_8$ and the signal $S_C$ is as shown in FIG. 7C. In FIG. 7C, the input signals $IN_1$ through $IN_8$ are equal to "00" (hexadecimal notation), the signal $S_C$ is "80". The value of the signal $S_C$ is increased until the input signals $IN_1$ through $IN_8$ reach "0F". Also, if the input signals $IN_1$ through $IN_8$ exceed "80", the value $S_C$ is decreased. Further, if the input signals $IN_1$ through $IN_8$ are equal to "FF", the value of the signal $S_C$ is "80".

The selector 63 selects one of the signals $S_A$, $S_B$ and $S_C$ in accordance with the scrambling codes $6_1$ and $7_1$. That is, if $(6_1, 7_1)=(0, 0)$, the selector 63 selects the signal $S_A$ and transmits it as the output signals $OUT_1$ through $OUT_8$ to the adder 9. Also, if $(6_1, 7_1)=(1, 1)$, the selector 63 selects the signal $S_B$ and transmits it as the output signals $OUT_1$ through $OUT_8$ to the adder 9. Further, if $(6_1, 7_1)=(0, 1)$, or $(1, 0)$ the selector 63 selects the signal $S_C$ and transmits it as the output signals $OUT_1$ through $OUT_8$ to the adder 9.

Note that the selector 63 can be easily made by logic circuits and switch circuits.

The adder 9 adds all the output signals from the correlators $8_1$ through $8_{254}$ and outputs the addition result as an obtained correlation value $COR_3$.

The operation of the matched filter of FIGS. 5 and 6 including the system of FIG. 2 will be explained next.

Firstly, the perch search section 2024 selects a 35 known scrambling code out the scrambling codes of the two types used for scrambling a long code mask symbol 35 as shown in FIG. 3D and uses it as scrambling codes $6_1$, through $6_{256}$. Then, the perch search section 2024 selects a scrambling code that the base station may possibly use and uses it as scrambling codes $7_1$ through $7_{256}$.

Then, an 8-bit input data IN obtained by the A/D conversion of a demodulated base band signal is sequentially held by the dynamic flip-flop circuits $1_1$ through $1_{256}$.

The input data IN held by the dynamic flip-flop circuits $1_1$ through $1_{256}$ is then input to the correlators $8_1$ through $8_{256}$ as an 8-bit signal.

Note that each of the bits of the scrambling codes $6_1$ through $6_{256}$ and the corresponding one of the bits of the scrambling codes $7_1$ through $7_{256}$ are combined as an input to the corresponding one of the correlators $8_1$ through $8_{256}$ as a 2-bit code values Then, if the code value is "00", the output signals $OUT_1$ through $OUT_8$ will become equal to "FF" that is the largest possible value when the input signals $IN_1$ through $IN_8$ are "FF". If the code value is "11", the output signals $OUT_1$ through $OUT_8$ will also become equal to "FF" that is the largest possible value when the input signals $IN_1$ through $IN_8$ are "00". If the code value is either "01", or "10", the output signals $OUT_1$ through $OUT_8$ will become equal to "FF" that is the largest possible value when the input signals $IN_1$ through $IN_8$ are "7F" or "80".

Thus, when both the known scrambling codes $6_1$ through $6_{256}$ and the selected scrambling codes $7_1$ through $7_{256}$ agree with the scrambling codes of the two types contained in the long code mask symbol 35, the absolute value of the obtained correlation value $COR_3$, expressed as a complement of 2 will become the largest. If the known scrambling codes $6_1$ through $6_{256}$ agree with the scrambling codes of the two types contained in the long code mask symbol 35, but the selected scrambling codes $7_1$ through $7_{256}$ do not agree with the scrambling codes of the two types contained in the long code mask symbol 35, then the absolute value of the obtained correlation value $COR_3$ expressed as a complement of 2 will not become large or, if it become large, it will not be as large as its counterpart when the two sets of scrambling codes agree with the scrambling codes of the two types. In this way, it is possible to determine if the selected scrambling codes $7_1$ through $7_{256}$ agree with the scrambling codes contained in the long code mask symbol 35.

Thus, in the above-mentioned embodiment, the scrambling codes of two sets are added and the added value is used to see the correlation value with the input data IN, so that the scrambling timings of the scrambling codes of the two types can be searched for simultaneously.

Also, in the above-mentioned embodiment, only a set of correlators $8_1$ through $8_{256}$ and an adder 9 are provided. Therefore, it there are 32 different types of scrambling codes that the base station may possibly use, the long code mask symbol 35 will have to be received 32 times in the worst case until the receiver can identify the scrambling code being used by the base station.

However, such a problem can be avoided by providing as many sets of correlators and an adder 8 as the number of types of scrambling codes that the base station may possibly use so that the receiver may well receive the long code mask symbol 35 only once to identify the scrambling code being used by the base station.

In the above-mentioned embodiment while the input data IN is held by the dynamic flip-flop circuits $1_1$ through $1_{256}$, the present invention is not limited to the use of dynamic flip-flop circuits for holding the input data and any other circuits may alternatively be used if they can hold the input data on a chip rate basis.

Additionally, while an input data IN having a bit width of 8 bits is obtained by the A/D convertion of a base band signal, the present invention is not limited to the use of an 8-bit signal for the input data IN and an input data with a bit width other than 8 bits may also be used for the purpose of the present invention.

As explained hereinabove, according to the present invention, since the scrambling codes of two sets are added and the added value is used to determine the correlation value with the input data IN, the scrambling timings of the scrambling codes of the two types can be searched for simultaneously. Thus, it is possible to effectively prevent any discrepancy in the correlating timing between the base station and the receiver that can lead to a total incapability of signal reception. Additionally, no power will be used for nothing for receiving a signal, because the two operations are carried out simultaneously.

What is claimed is:

1. A matched filter comprising:
   a plurality of data holding circuits adapted to sequentially hold a plurality of straight binary data;
   a plurality of correlators, each connected to one of said data holding circuits, each of said correlators receiving one bit of a known code and one bit of a selected code as a 2-bit code, outputting said straight binary data as it is when said 2-bit code is "00", outputting said straight binary data after logically inverting when said straight binary data when said 2-bit code is "11", and outputting exclusive OR values between said straight binary data except for a most significant bit thereof and said most significant bit while outputting "1" for said most significant bit when said 2-bit code is one of "01" and "10";
   an adder, connected to said correlators, for adding output signals of said correlators and outputting an addition result as a correlation value.

2. The matched filter as set forth in claim 1, wherein each of said data holding circuits comprises a dynamic flip-flop circuit.

3. The matched filter as set forth in claim 1, wherein each of said correlators comprises:
   an inverter circuit section for receiving said straight binary data and outputting inverted data of said straight binary data;
   an exclusive OR circuit section including a plurality of exclusive OR circuits each receiving one bit of said straight binary data except for a most significant bit of said straight binary data and receiving said most significant bit, and a circuit for generating "1" as a most significant bit output; and
   a selector, connected to one of said data holding circuits, said inverter circuit section and said exclusive OR circuit section, for selecting one of said straight binary data, said inverted data of said straight binary data and output data of said exclusive OR circuit section in accordance with said 2-bit code.

4. A code division multiplex access receiver for receiving straight binary input data obtained by an analog/digital conversion of a base band signal generated by demodulating a received signal on a chip rate basis, said receiver comprising a perch search section including a matched filter, said matched filter comprising:

a plurality of data holding circuits adapted to sequentially hold said straight binary input data;

a plurality of correlator, each connected to one of said data holding circuits, each of said correlators receiving one bit of a known scrambling code and one bit of a scrambling code selected by a base station as a 2-bit code outputting said straight binary input data as it is when said 2-bit code is "00", outputting said straight binary input data after logically inverting said straight binary input data when said 2-bit code is "11", and outputting exclusive OR values between said straight binary input data except for its most significant bit thereof and said most significant bit while outputting "1" for said most significant bit when said 2-bit code is one of "01" and "10";

an adder, connected to said correlators, for adding output signals of said correlators and outputting an addition result as a correlation value.

5. The receiver as set forth in claim 4, wherein each of said data holding circuits comprises a dynamic flip-flop circuit.

6. The receiver as set forth in claim 4, wherein each of said correlators comprises:

an inverter circuit section for receiving said straight binary input data and outputting inverted data of said straight binary input data;

an exclusive OR circuit section including a plurality of exclusive OR circuits each receiving one bit of said straight binary input data except for a most significant bit of said straight binary input data receiving and said most significant bit, and a circuit for generating "1" as a most significant bit output; and a selector, connected to one of said data holding circuits, said inverter circuit section and said exclusive OR circuit section, for selecting one of said straight binary input data, said inverted data of said straight binary input data and output data of said exclusive OR circuit section in accordance with said 2-bit code.

7. The receiver as set forth in claim 4, wherein the number of sets of said correlators and said adder is made equal to the number of types of scrambling codes that can be used by said base station.

8. The receiver as set forth in claim 4, wherein said matched filter is adapted to input different ones of scrambling codes possibly being used by said base station to said correlators and to determine a correlation simultaneously for all said correlators to receive an obtained correlation value from said adder and identify a scrambling code being used by said base station.

* * * * *